United States Patent
Carruth et al.

[19]

[11] Patent Number: 6,015,175
[45] Date of Patent: Jan. 18, 2000

[54] MAGNETIC HOLDING DEVICE

[75] Inventors: Cary Carruth, East China; Frederick A. Mondro, Harrison Township; John J. Peralta, Roseville; Robert Pelletier, Macomb; Nickolas Kovacs, Garden City, all of Mich.

[73] Assignee: Chrysler Corporation, Auburn Hills, Mich.

[21] Appl. No.: 08/964,675

[22] Filed: Nov. 5, 1997

[51] Int. Cl.⁷ .................................................... B66C 1/04
[52] U.S. Cl. .......................................... 294/65.5; 294/88
[58] Field of Search .................... 294/65.5, 64.1, 294/2, 88; 335/285, 295; 414/606, 737

[56] References Cited

U.S. PATENT DOCUMENTS

| | | | |
|---|---|---|---|
| 1,685,707 | 9/1928 | Keedy . | |
| 2,417,762 | 3/1947 | Koller | 294/65.5 |
| 2,976,075 | 3/1961 | Budreck | 294/65.5 |
| 3,079,191 | 2/1963 | Engelsted et al. | 294/65.5 |
| 3,250,962 | 5/1966 | Palme | 317/164 |
| 3,257,141 | 6/1966 | Buus et al. | 294/65.5 |
| 3,320,686 | 5/1967 | Blackburn | 35/19 |
| 4,002,141 | 1/1977 | Shrader | 294/65.5 |
| 4,121,865 | 10/1978 | Littwin, Sr. | 294/65.5 |
| 4,620,739 | 11/1986 | Coralline | 294/65.5 |
| 5,818,318 | 10/1998 | Ligthart et al. | 335/285 |

FOREIGN PATENT DOCUMENTS

| | | |
|---|---|---|
| 1812103 | 5/1990 | Russian Federation . |
| 1094296 | 12/1967 | United Kingdom . |

*Primary Examiner*—Dean J. Kramer
*Assistant Examiner*—Paul Chin
*Attorney, Agent, or Firm*—Lawrence Shurupoff

[57] ABSTRACT

A magnetic holding device includes a hollow cylinder having closed ends. A rodless piston is slidable within the cylinder for movement between the ends. A magnet is carried by the piston. The piston is driven back and forth in the cylinder by air pressure. The magnet is adapted to pick up a workpiece adjacent to one end of the cylinder when the piston is driven toward that end of the cylinder.

15 Claims, 2 Drawing Sheets

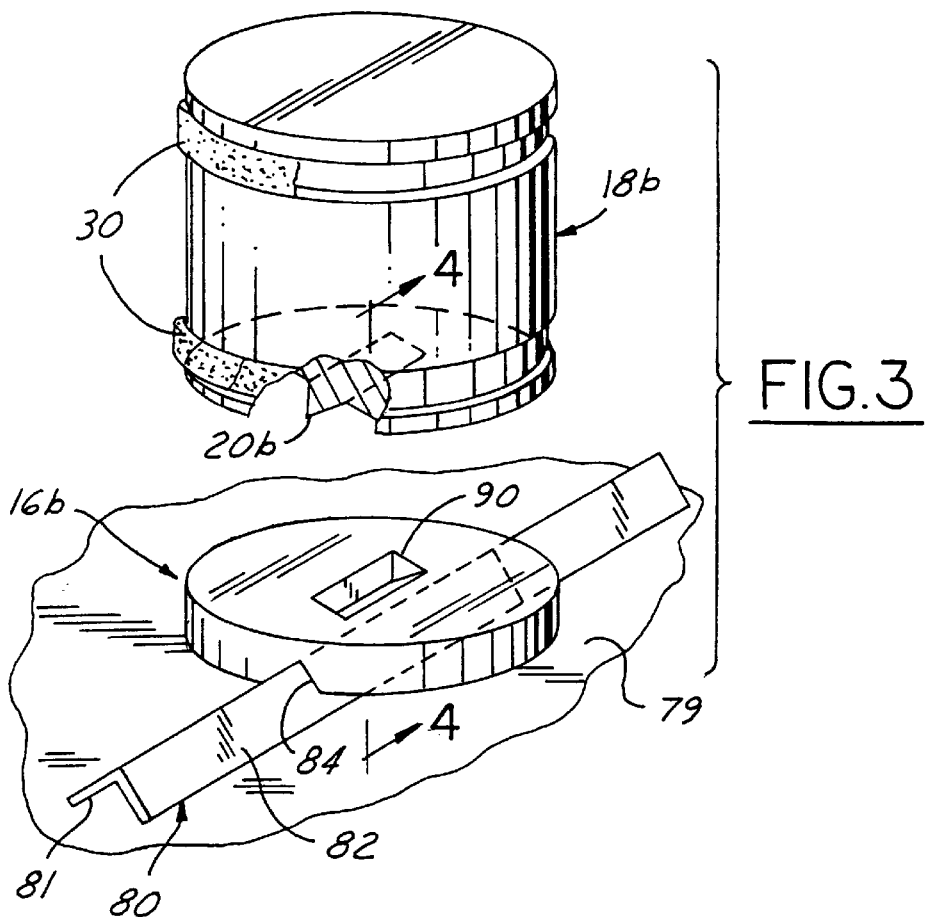
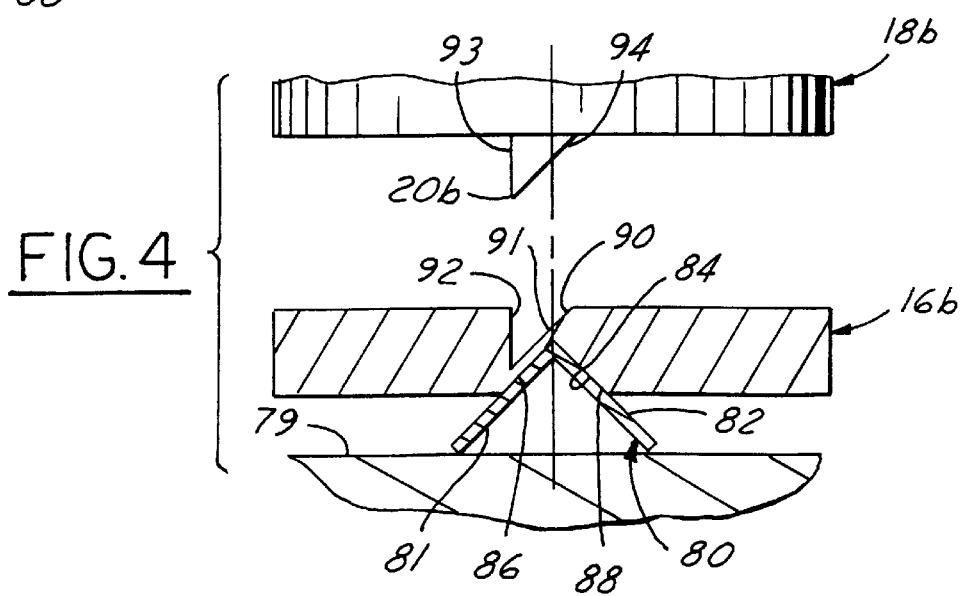

MAGNETIC HOLDING DEVICE

FIELD OF INVENTION

This invention relates generally to holding devices and more particularly to a magnetic device for holding parts.

BACKGROUND OF THE INVENTION

Parts, especially relatively small and narrow parts, are typically extracted from press lines by venturi vacuum cups. Shop air is used for this purpose. However, in practice, the parts are frequently dropped by the vacuum cups. For small, narrow parts, there is usually not enough room to properly locate a small cup. Also, vacuum cups must be set exactly to the contour of the part in order to be effective.

SUMMARY OF THE INVENTION

The holding device of this invention is designed to replace vacuum venturi cups. The holding device of this invention is faster on set up (more forgiving than vacuum cups) and very reliable. The device of this invention can be operated with only a minimum amount of air, in contrast to the large volume of air required for venturi vacuum cups, thus saving plant air. The device of this invention is quiet in operation in contrast to the noise and whistling sounds typical of a venturi used to activate a vacuum cup. Also, a certain amount of oil from a compressor driving the air gets out into the plant when venturi cups are used. This is not a problem with a magnetic holding device. The device of this invention is formed of lightweight materials having a long life and preferably using a permanent magnet with maximum pick-up power. The device of this invention can be built in different sizes, to fit individual parts and enabling it to be used in other applications.

One object of this invention is to provide a magnetic holding device having the foregoing features and capabilities.

Another object of the invention is to provide a magnetic holding device which is composed of a relatively few simple parts, is rugged and durable in use, and is capable of being inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 3 is an exploded, fragmentary perspective view showing a further modification.

FIG. 4 is a sectional view taken on the line 4—4 in FIG. 3.

DETAILED DESCRIPTION OF THE PREFERRED EMBODIMENTS

Figure 1:
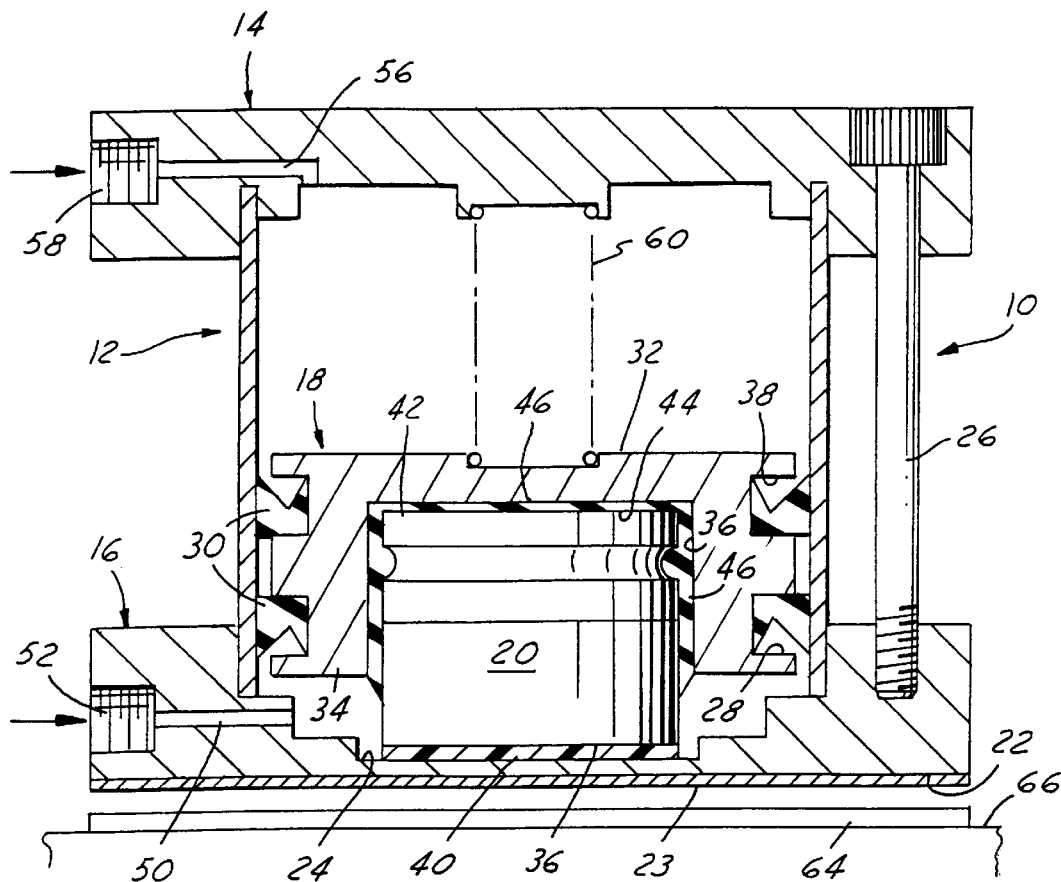
FIG. 1 is a sectional view of a magnetic holding device embodying the invention.

Referring now more particularly to the drawings, and especially FIG. 1, there is shown a device 10 embodying the invention which comprises a cylinder 12, end caps 14 and 16, a piston 18 and a magnet 20 carried by the piston.

The cylinder 12 is preferably of uniform circular cross-section from end to end and is open at both ends. The end cap 14 is fitted on and closes the upper end of the cylinder. The end cap 16 is fitted on and closes the lower end of the cylinder. The lower end cap 16 has a flat, planar outer wall 22 perpendicular to the longitudinal centerline of the cylinder. A thin wear-resistant plate 23 of a non-magnetic material such as stainless steel is secured to the outer wall 22. The lower end cap 16 has an inner wall formed with a flat planar central surface portion 24 parallel to the outer wall 22. The end caps are secured on the cylinder by any suitable means, as, for example, by socket head screws 26.

The lower end cap 16 at the central surface portion 24 is quite thin, preferably about 0.075 of an inch, and the plate 23 is also quite thin, preferably about 0.024 of an inch, so that the pick-up power of the magnet extends through the lower end cap without significant reduction.

The piston 18 is mounted in the cylinder for sliding movement from one end of the cylinder to the other. The piston has a cylindrical side wall fitted within the cylinder and is formed with annular grooves 28. Seals 30 within the grooves 28 seal against the inner wall of the cylinder. The piston is rodless and has flat parallel end faces 32 and 34 which are perpendicular to the longitudinal centerline of the cylinder.

The cylinder, end caps and piston may be made of a suitable lightweight material, preferably aluminum.

The piston 18 has a central bore or socket 36 which opens through the bottom face 34 of the piston. The magnet 20 is secured in the socket. The magnet 20 extends downwardly beneath the lower face 34 of the piston and has a flat planar bottom surface 37 which is parallel to the flat planar central surface portion 24 of the end cap 16. The magnet is preferably a permanent magnet and has a thin plate 40 of non-magnetic material covering the lower face 37. The plate 40 prevents the magnet from magnetically sticking to the lower end cap 16 when it is desired to raise the piston away from the FIG. 1 position. Preferably, although not necessarily, a ferromagnetic block 42 preferably of steel is secured in the socket 36 between the magnet 20 and the base 44 of the socket. The block 42 serves as a magnetic flux concentrater or intensifier to enhance the lifting power of the magnet. The block 42 and magnet 20 are secured in the socket of the piston by any suitable means which may include a rubber adhesive liner 46.

The lower end cap 16 has a channel 50 which opens into the cylinder 12 beneath the piston 18 and communicates with a threaded bore 52 for receiving a threaded air hose fitting. The upper end cap 14 has a channel 56 which opens into the cylinder 12 above the piston 18 and communicates with a threaded bore 58 for receiving a second threaded air hose fitting.

Suitable control means, not shown, may be provided to introduce air under pressure to either one of the channels 50 or 56 while opening the other channel to exhaust. By introducing air under pressure through the channel 50 into the cylinder beneath the piston and opening the channel 56 to exhaust, the piston may be raised. By introducing air under pressure to the upper channel 56 above the piston and opening the channel 50 to exhaust, the piston may be lowered to the position shown in FIG. 1 in which the plate 40 on the lower face 37 of the magnet contacts the central surface portion 24 of the lower end cap 16. Rather than lowering the piston by air pressure through the upper channel 56, the piston may be lowered simply by gravity assuming that the lower channel 50 is open. A spring 60 may, if desired, be employed to urge the piston downwardly. The spring is shown as a coil spring compressed between the top of the piston 18 and the upper end cap 14.

The device 10 may be mounted on the end of an arm or similar holder and inserted into a press to engage a workpiece or part 64 on the bed 66 of a press. With the piston in the lower position shown in FIG. 1 and with the plate 23 on the bottom surface of the bottom end cap 16 contacting the part, the part will be held by magnetic attraction. The device 10 with the part magnetically secured thereto may then be raised and removed from the press. When the piston is thereafter raised to its upper limit, the magnet will be spaced above the part far enough to cause the part to be released. The piston is raised and lowered within the chamber of the cylinder of device 10 by the use of the air line connections previously described or by simple gravity, assisted if desired by the compression spring 60.

Figure 2:
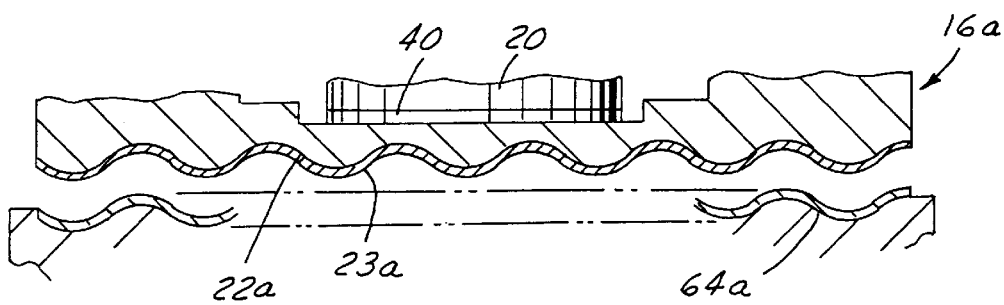
FIG. 2 is a fragmentary view showing a modification of the device shown in FIG. 1.

FIG. 2 illustrates a modification of the device of FIG. 1 in which the outer wall 22a of the bottom end cap 16a has a special configuration to match the configuration of the workpiece 64a. A thin plate 23a of non-magnetic material covers and is secured to the outer wall 22a. In this case, the outer wall 22a and plate 23a on the lower end cap and the workpiece have a wavy configuration, but obviously other configurations are possible. Since the bottom of the end cap is configured to match the configuration of the workpiece, a more effective contact and magnetic holding of the workpiece is achieved. Other than as illustrated, the embodiment of FIG. 2 is like that of FIG. 1.

FIGS. 3 and 4 show a further modification of the device, designed to magnetically hold and pick up a workpiece on a press bed 79. The workpiece is in the form of an elongated narrow V-shaped member 80 having side flanges 81 and 82. Only the piston, magnet, and lower end cap are shown, the other parts being the same as in the embodiment of FIG. 1. The bottom surface of the lower end cap 16b has an elongated, open-ended V-shaped recess 84 of the same angular configuration as the workpiece so that when the device comes down upon the workpiece, the workpiece will fit into the recess 84 in the end cap with the side flanges 81 and 82 of the workpiece in flush engagement with the sides 86 and 88 of the recess. Any slight misalignment of the device and the workpiece will cause the workpiece to shift into position so that it will enter into the recess. Thus, it is not necessary to perfectly align the holding device with the workpiece.

The upper surface of the lower end cap 16b has a V-shaped recess 90 which has a side 91 parallel to the side 86 of recess 84 and a second angularly related side 92. The magnet 20b in this embodiment is in the form of a projection which is secured to the bottom face of the piston 18b and compliments the recess 90. The magnet 20b is chisel-shaped with angularly related side walls 93 and 94 matching the angle of the sides 91 and 92 of the recess 90 so that the magnet will fit nicely into the recess and be closely adjacent to the part 80 in the lower recess 84.

What is claimed is:

1. A magnetic holding device, comprising:
    a hollow cylinder having opposed first and second end portions;
    a piston slidably mounted within said cylinder;
    a magnet carried by said piston;
    a first end cap provided on said first end portion of said cylinder;
    a second end cap provided on said second end portion of said cylinder;
    a first fluid port communicating with said cylinder adjacent said first end portion of said cylinder for driving said piston toward said second end portion of said cylinder; and
    a second fluid port communicating with said cylinder adjacent said second end portion of said cylinder for driving said piston toward said first end portion of said cylinder,
    said magnet being adapted to pick up a workpiece adjacent said first end cap when said piston is driven toward said first end portion of said cylinder.

2. The device of claim 1, wherein said first and second fluid ports are respectively formed through said first and second end caps.

3. The device of claim 1, wherein said cylinder, said piston and said first and second end caps each comprises aluminum.

4. The device of claim 1, wherein said piston is formed with a bore and further comprising a ferromagnetic member mounted in said bore adjacent said magnet.

5. The device of claim 1, wherein said piston comprises a rodless piston having opposed flat end faces.

6. The device of claim 1, wherein said first end cap further comprises a non-magnetic wear resistant outer surface portion.

7. The device of claim 1, wherein said first end cap comprises a first annular side wall and wherein said first fluid port is formed through said first annular side wall.

8. The device of claim 1, wherein said first end cap comprises an outer surface having a non-uniform contour.

9. A magnetic holding device, comprising:
    a hollow cylinder having first and second ends;
    a rodless piston having a central bore formed therein, said piston being slidably mounted within said cylinder for movement between said first and second ends;
    a permanent magnet mounted within said bore of said piston;
    said piston further having at least one annular groove formed therein;
    an annular seal mounted within said annular groove and sealing against said cylinder;
    a first end cap fitted over the first end of said cylinder;
    a second end cap fitted over the second end of said cylinder; and
    a channel formed through said first end cap for permitting passage of fluid into and out of said cylinder,
    said magnet being adapted to pick up a workpiece adjacent said first end cap when said piston is moved to a position near said first end cap.

10. The device of claim 9, wherein said channel communicates with a threaded bore for receiving a threaded-air hose fitting.

11. The device of claim 10, further comprising a compression spring mounted within said cylinder between said second end cap and said piston, and biasing said piston toward said first end cap.

12. The device of claim 11, wherein said first end cap has an outer surface formed with a first recess adapted to receive a part to be held, said first end cap has an inner surface formed with a second recess opposite said first recess, said magnet having a projection complementing said second recess and receivable therein.

13. A magnetic holding device, comprising:
    a hollow cylinder having opposed first and second end portions;
    a piston slidably mounted within said cylinder;
    a magnet carried by said piston;
    a first end cap provided on said first end portion of said cylinder;

a second end cap provided on said second end portion of said cylinder, and a fluid port communicating with said cylinder adjacent said first end portion of said cylinder;

said magnet being adapted to pick up a workpiece adjacent said first end cap when said piston is driven toward said first end portion of said cylinder.

14. The device of claim 13, wherein said fluid port is formed in said first end cap.

15. A magnetic holding device, comprising:

a hollow cylinder having first and second end portions;

a piston slidably mounted within said cylinder for movement between said first and second end portions;

a permanent magnet carried by said piston;

a first end cap fitted on the first end portion of said cylinder;

a second end cap fitted on the second end portion of said cylinder; and fluid passage means for admitting fluid into and out of the first and second end portions of said cylinder to drive said piston in opposite directions toward and away from said first end cap, said magnet being adapted to pick up a workpiece adjacent said first end cap when said piston is moved to a position near said first end cap.

* * * * *